United States Patent
Habetha (12)

(10) Patent No.: US 7,061,895 B1
(45) Date of Patent: Jun. 13, 2006

(54) RECONFIGURATION OF AN AD HOC NETWORK

(75) Inventor: Joerg Habetha, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 820 days.

(21) Appl. No.: 09/947,775

(22) Filed: Sep. 7, 2001

(30) Foreign Application Priority Data

Sep. 11, 2000  (DE) ................................ 100 44 994

(51) Int. Cl.
*H04Q 7/24* (2006.01)
(52) U.S. Cl. .................................................. 370/338
(58) Field of Classification Search ................. 370/404, 370/422, 332, 386, 390, 328, 254, 408; 708/520; 709/249, 220
See application file for complete search history.

(56) References Cited

U.S. PATENT DOCUMENTS 5,724,346 A  3/1998  Kobayashi et al. ......... 370/329
2003/0037167 A1*  2/2003  Garcia-Luna-Aceves et al. ........................................ 709/238

2004/0174829 A1*  9/2004  Ayyagari ..................... 370/254

FOREIGN PATENT DOCUMENTS

EP  0695059 A1  1/1996

OTHER PUBLICATIONS

By J. Habetha et al. Entitle: Central Controller Handover Procedure for ETSI-BRAN HiperLan/2 Ad Hoc Networks and Clustering with Quality of Service Guarantees, 1st IEEE Annual Workshop on Mobile Ad Hoc Networking & Computing, Aug. 11, 2000.
Habetha et al: "Central controller handover procedure for ETSI-BRAN HiperLan/2 Ad Hoc networks and clustering with quality of service guarantees" 1st IEEE Annual Workshop On Mobile Ad Hoc Networking & Computing, Aug. 11, 2000, pp. 131-132.

* cited by examiner

*Primary Examiner*—Duc Ho
(74) *Attorney, Agent, or Firm*—Larry Lieberchuk

(57) ABSTRACT

A network includes a plurality of terminals of which at least one terminal is provided for storing certain traffic ratios measured at predetermined distances between at least part of the terminals. At least one terminal is provided for ascertaining, based on the stored traffic ratio, whether a change of the function of network controller from one terminal to another is necessary.

20 Claims, 2 Drawing Sheets

Figure 1:
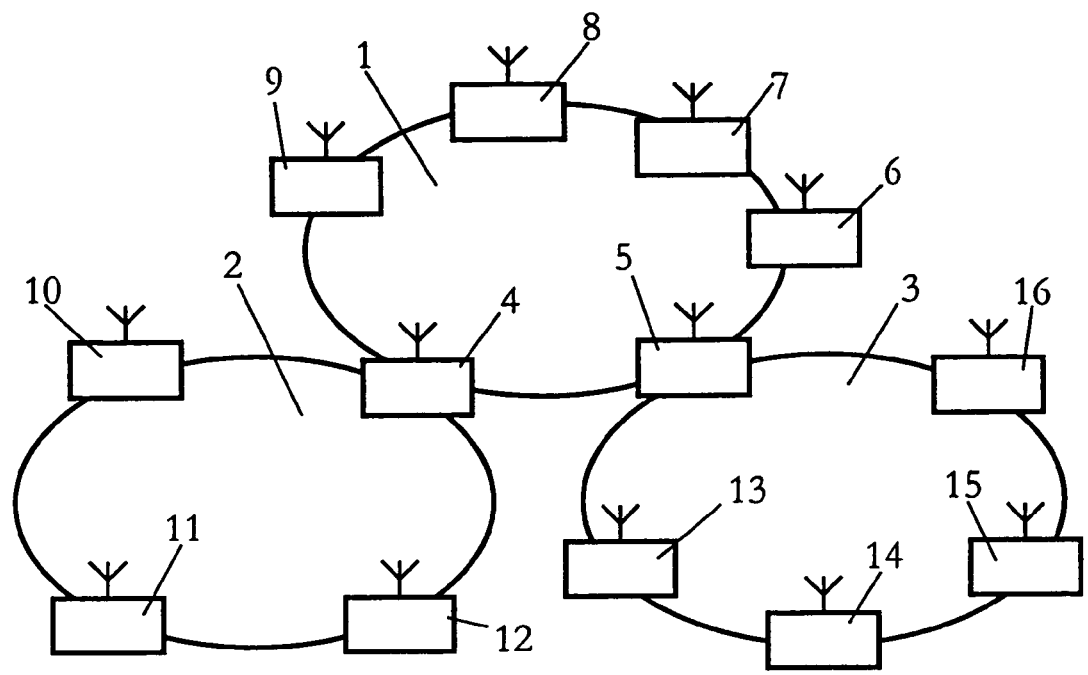

|    | T1       | T2       | T3       | T4       | T5       |
|----|----------|----------|----------|----------|----------|
| T1 |          | RSS2(2,1)| RSS2(3,1)| RSS2(4,1)| RSS2(5,1)|
| T2 | RSS2(1,2)|          | RSS2(3,2)| RSS2(4,2)| RSS2(5,2)|
| T3 | RSS2(1,3)| RSS2(2,3)|          | RSS2(4,3)| RSS2(5,3)|
| T4 | RSS2(1,4)| RSS2(2,4)| RSS2(3,4)|          | RSS2(5,4)|
| T5 | RSS2(1,5)| RSS2(2,5)| RSS2(3,5)| RSS2(4,5)|          |
| T6 | RSS2(1,6)| RSS2(2,6)| RSS2(3,6)| RSS2(4,6)| RSS2(5,6)|

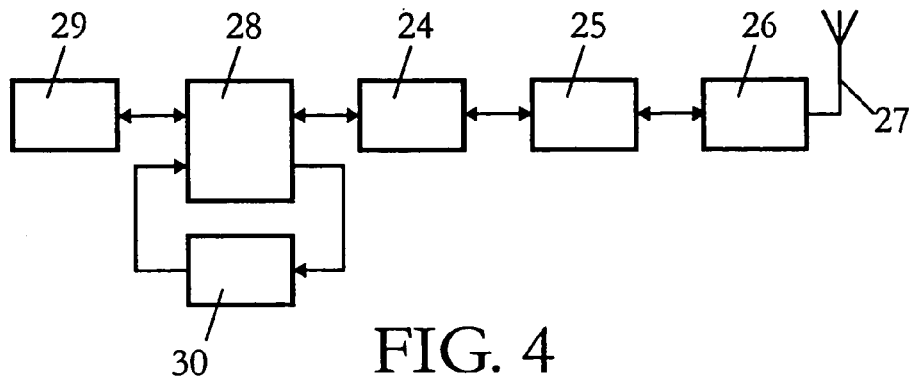
FIG. 4
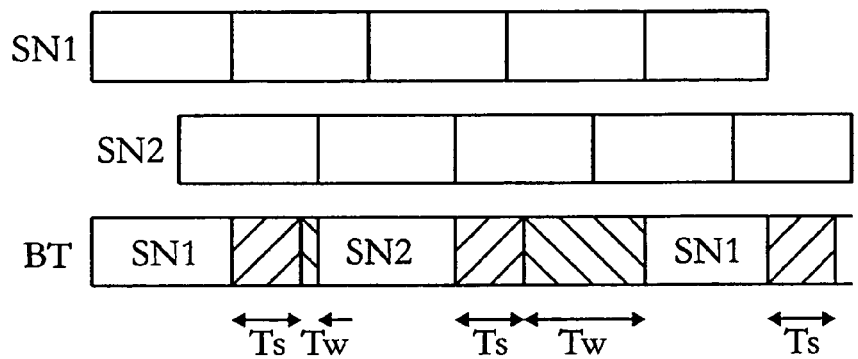
FIG. 5
| | T1 | T2 | T3 | T4 | T5 |
|---|---|---|---|---|---|
| T1 | × | RSS2(2,1) | RSS2(3,1) | RSS2(4,1) | RSS2(5,1) |
| T2 | RSS2(1,2) | × | RSS2(3,2) | RSS2(4,2) | RSS2(5,2) |
| T3 | RSS2(1,3) | RSS2(2,3) | × | RSS2(4,3) | RSS2(5,3) |
| T4 | RSS2(1,4) | RSS2(2,4) | RSS2(3,4) | × | RSS2(5,4) |
| T5 | RSS2(1,5) | RSS2(2,5) | RSS2(3,5) | RSS2(4,5) | × |
| T6 | RSS2(1,6) | RSS2(2,6) | RSS2(3,6) | RSS2(4,6) | RSS2(5,6) |
| | | | | | |
FIG. 6

RECONFIGURATION OF AN AD HOC NETWORK

The invention relates to an ad hoc network comprising a plurality of terminals. Such ad hoc networks are self-organizing and may comprise, for example, a plurality of sub-networks.

The document "J. Habetha, A. Hettich, J. Peetz, Y. Du: Central Controller Handover Procedure for ETSI-BRAN HIPERLAN/2 Ad Hoc Networks and Clustering with Quality of Service Guarantees, 1st IEEE Annual Workshop on Mobile Ad Hoc Networking & Computing, Aug. 11, 2000", discusses an ad hoc network comprising a plurality of terminals. At least one terminal is provided as a controller for controlling the ad hoc network. Under certain conditions it may be necessary for another terminal to become controller. For determining a new controller, inter alia the LDV and the ICT method are proposed. With the LDV method (LDV=Lowest Distance Value), each terminal calculates the sum of the distances to its respective neighboring terminals and divides this sum by the number of the neighboring terminals. The terminal having the lowest value becomes the new controller. With the ICT method (ICT=Highest In-Cluster Traffic), the terminal that has the highest traffic with the neighboring terminals is selected as the controller.

It is an object of the invention to provide a network that has measures for finding a terminal with a control function (controller) in a simple manner.

The object is achieved by a network of the type defined in the opening paragraph via the following measures:

The network comprises a plurality of terminals of which
at least one terminal is provided for storing certain traffic ratios between at least part of the terminals measured at predefined distances and
at least one terminal is provided for ascertaining, based on the stored traffic ratios, whether a change of the function of network controller from one terminal to another is necessary.

According to the invention the traffic ratios measured in one or various terminals of the network are stored at predefined intervals. They may be, for example, the measurement of the received signal strength or the measurement of the user data traffic from one terminal to another. It is alternatively possible for at least the terminal referred to as controller, which terminal has the function of network controller, to be provided for storing the traffic ratios between at least part of the terminals in the form of a matrix. A change of the function of network controller of a terminal i.e. the change of the function of controller, may be necessary when this is determined on the basis of the stored traffic ratios or the matrix. This decision may be made by the current controller or any terminal, on condition that the stored matrix is broadcast to these terminals.

A criterion for the change of controller may be a value that is the result of all the receive signal strengths of a terminal to its neighboring terminals divided by the number of the neighboring terminals. The terminal having the lowest value then takes over the function of controller. A further criterion may be a value that is the result of the sum of the useful data traffic of a terminal and the neighboring terminals. The terminal having the highest value then becomes the controller.

The network may also comprise a plurality of sub-networks which have each a terminal referred to as controller and perform the respective function of network controller of the sub-network. These sub-networks exchange messages and data via bridge terminals. At least one terminal in a sub-network is used for storing the traffic ratios of the respective sub-network and the traffic ratios of the other sub-networks. When the traffic ratios change, the sub-networks can receive other controllers and thus also other assigned terminals, as appropriate.

The data which are transmitted in the network may be generated, for example, in accordance with a packet transmission method. The packets may be transmitted over the wireless medium as whole packets or as sub-packets after further information has been affixed. A wireless transmission is understood to mean a radio, infrared or ultrashell transmission etc. As a packet transmission method may be used, for example, the asynchronous transfer mode (ATM), which generates packets of fixed length which are called cells.

These and other aspects of the invention are apparent from and will be elucidated with reference to the embodiments described hereinafter.

Figure 2:
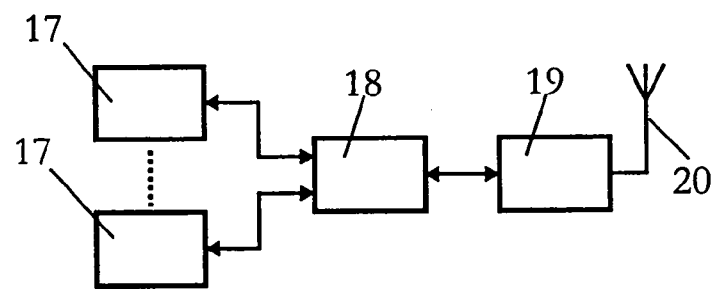
Figure 3:
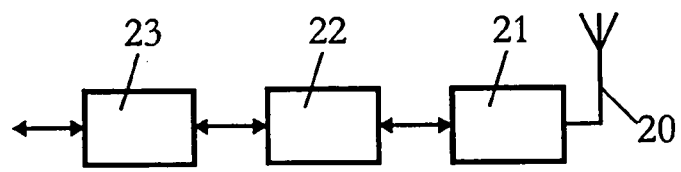

In the drawings:

FIG. 1 shows an ad hoc network comprising three sub-networks which each contain terminals provided for radio transmission, FIG. 2 shows a terminal of the local area network as shown in FIG. 1, FIG. 3 shows a radio device of the terminal shown in FIG. 2, FIG. 4 shows an embodiment of a bridge terminal provided as a connection between two sub-networks, FIG. 5 shows MAC frames of two sub-networks and the MAC frame structure of a bridge terminal and FIG. 6 shows a matrix presenting the received signal strengths between various terminals.

The example of embodiment shown in the following relates to ad hoc networks which are self-organizing, which is in contrast to traditional networks. Each terminal in such an ad hoc network may make access possible to a fixed network and can immediately be used. An ad hoc network is characterized in that the structure and the number of subscribers are not fixed within predefined limit values. For example, a subscriber's communication device may be removed from the network or included therein. Contrary to traditional mobile radio networks, an ad hoc network is not limited to a fixedly installed infrastructure.

The size of the area of the ad hoc network is usually much larger than the transmission range of one terminal. A communication between two terminals may therefore require that further terminals be switched on, so that these messages or data can be transmitted between the two communicating terminals. Such ad hoc networks, in which a transfer of messages and data over a terminal is necessary, are referred to as multihop ad hoc networks. A possible organization of an ad hoc network consists of regularly forming sub-networks or clusters. A sub-network of the ad hoc network can be formed, for example, by terminals connected via radio paths of subscribers sitting at a table. Such terminals may be, for example, communication devices for the wireless exchange of messages, pictures and so on.

There may be two types of ad hoc networks. They are decentralized and centralized ad hoc networks. In a decentralized ad hoc network the communication between the terminals is decentralized, that is to say, each terminal can directly communicate with any other terminal, provided that the terminals are located within the transmission range of the other terminal. The advantage of a decentralized ad hoc network is its simplicity and robustness to errors. In a centralized ad hoc network, certain functions such as, for example, the function of multiple access of a terminal to the radio transmission medium (Medium Access Control=MAC) is controlled by one specific terminal per sub-network. This terminal is referred to as central terminal or central controller (CC). These functions need not always be carried out by the same terminal, but can be handed over by a terminal acting as a central controller to another terminal then acting as a central controller. The advantage of a centralized ad hoc network is that in this network an agreement about the quality of service (QoS) is possible in a simple manner. An example for a centralized ad hoc network is a network that is organized according to the HiperLAN/2 Home Environment Extension (HEE) (compare J. Habetha, A. Hettich, J. Peetz, Y. Du, "Central Controller Handover Procedure for ETSI-BRAN HIPERLAN/2 Ad Hoc Networks and Clustering with Quality of Service Guarantees", $1^{st}$ IEEE Annual Workshop on Mobile Ad Hoc Networking & Computing, Aug. 11, 2000).

FIG. 1 shows an example of embodiment of an ad hoc network having three sub-networks 1 to 3, which each contain a plurality of terminals 4 to 16. Constituent parts of the sub-network 1 are the terminals 4 to 9, of the sub-network 2 the terminals 4 and 10 to 12, and of the sub-network 3 the terminals 5 and 13 to 16. In a sub-network the terminals belonging to a respective sub-network exchange data over radio paths. The ellipses shown in FIG. 1 indicate the radio coverage of a sub-network (1 to 3), in which a largely problem-free radio transmission is possible between the terminals belonging to the sub-network.

The terminals 4 and 5 are called bridge terminals, because they enable an exchange of data between two sub-networks 1 and 2 or 1 and 3, respectively. The bridge terminal 4 is used for the data traffic between the sub-networks 1 and 2 and the bridge terminal 5 for the data traffic between the sub-networks 1 and 3.

A terminal 4 to 16 of the local area network shown in FIG. 1 may be a mobile or fixed communication device and comprises, for example, at least a station 17, a connection controller 18 and a radio device 19 with an antenna 20, as shown in FIG. 2. A station 17 may be, for example, a portable computer, telephone and so on and so forth.

A radio device 19 of the terminals 6 to 16 comprises, as shown in FIG. 3, in addition to the antenna, a high-frequency circuit 21, a modem 22 and a protocol device 23. The protocol device 23 forms packet units from the data stream received from the connection controller 18. A packet unit contains parts of the data stream and additional control information formed by the protocol device 23. The protocol device uses protocols for the LLC layer (LLC=Logic Link Control) and the MAC layer (MAC=Medium Access Control). The MAC layer controls the multiple access of a terminal to the radio transmission medium and the LLC layer carries out a flow and error control.

As observed above, in a sub-network 1 to 3 of a centralized ad hoc network, a specific terminal is responsible for the control and management functions and is referred to as central controller. The controller furthermore works as a normal terminal in the associated sub-network. The controller is responsible, for example, for the registration of terminals that operate in the sub-network, for the connection set-up between at least two terminals in the radio transmission medium, for the resource management and for the access control in the radio transmission medium. For example, after the registration and announcement of a transmission request a terminal of a sub-network is assigned transmission capacity for data (packet units) by the controller.

In the ad hoc network, the data can be exchanged between the terminals in accordance with a TDMA, FDMA or CDMA method (TDMA=Time Division Multiple Access, FDMA=Frequency Division Multiple Access, CDMA=Code Division Multiple Access). The methods may also be combined. To each sub-network 1 to 3 of the local area network are assigned a number of specified channels which are referred to as a channel group. A channel is determined by a frequency range, a time range and, for example in CDMA methods, by a spreading code. For example, each sub-network 1 to 3 can have a certain, respectively different frequency range available for the data exchange, which range has a carrier frequency $f_i$. In such a frequency range may be transmitted, for example, data by means of the TDMA method. The sub-network 1 may then be assigned the carrier frequency $f_1$, the sub-network 2 the carrier frequency $f_2$ and the sub-network 3 the carrier frequency $f_3$. The bridge terminal 4 works at the carrier frequency $f_1$, on the one hand, to carry out an exchange of data with the other terminals of the sub-network 1 and, on the other hand, at the carrier frequency $f_2$, to carry out a data exchange with the other terminals of the sub-network 2. The second bridge terminal 5 contained in the local area network, which bridge terminal 5 transmits data between the sub-networks 1 and 3, works at the carrier frequencies $f_1$ and $f_3$.

As observed above, the central controller has, for example, the function of access controller. This means that the central controller is responsible for the formation of frames of the MAC layer (MAC frames). For this purpose the TDMA method is used. Such a MAC frame has various channels for control information and useful data.

A block diagram of an example of embodiment of a bridge terminal is shown in FIG. 4. The radio switching device of this bridge terminal comprises a protocol device 24, a modem 25 and a high-frequency circuit 26 with an antenna 27. To the protocol device 24 is connected a radio switching device 28, which is further connected to a connection controller 29 and a buffer arrangement 30. In this embodiment the buffer arrangement 30 contains one storage element and is used for buffering data and realized as a FIFO module (First In First Out), that is, the data are read from the buffer arrangement 30 in the order in which they were written. The terminal shown in FIG. 4 may also work as a normal terminal. Stations not shown in FIG. 4, but connected to the connection controller 29, then supply data to the radio switching device 28 via the connection controller 29.

The bridge terminal shown in FIG. 4 is alternately synchronized with a first and a second sub-network. Synchronization is understood to mean the entire process of integrating a terminal with the sub-network for the exchange of data. If the bridge terminal is synchronized with the first sub-network, it can exchange data with all the terminals and with the controller of this first sub-network. If the connection controller 29 supplies data to the radio switch device 28, the destination of which data is a terminal or the controller of the first sub-network, or a terminal or controller of another sub-network that can be reached via the first sub-network, the radio switch device conveys these data directly to the protocol device 24. In the protocol device 24 the data are buffered until the time slot is reached which the controller has intended to be used for the transmission. If the data coming from the connection controller 29 are to be transmitted to a terminal or to the controller of the second sub-network, or to another sub-network to be reached via the second sub-network, the radio transmission is to be delayed until the time slot in which the bridge terminal is synchronized with the second sub-network. For this purpose, the radio switch device transports the data whose destination lies in the second sub-network, or whose destination can be reached via the second sub-network, to the buffer device 30, which buffers the data until the bridge terminal is synchronized with the second sub-network.

If data from a terminal or the controller of the first sub-network are received by the bridge terminal and their destination is a terminal or the controller of a second sub-network, or a terminal or controller of another sub-network to be reached via the second sub-network, these data are stored in the buffer device 30 until the synchronization with the second sub-network. Data whose destination is a station of the bridge terminal are directly conveyed to the connection controller 29 via the radio switch device 28, which controller then leads the received data to the desired station. Data whose destination is neither a station of the bridge terminal nor a terminal or controller of the second sub-network, are sent, for example, to a further bridge terminal.

After the change of synchronization of the bridge terminal from the first to the second sub-network, the data located in the buffer device 30 are read out again from the buffer device 30 in the order in which they have been written. Subsequently, during the time when the bridge terminal is synchronized with the second sub-network, all the data whose destination is a terminal or the controller of the second sub-network, or another sub-network to be reached via the second sub-network, are immediately conveyed to the protocol device 24 by the radio switch device 28, and only the data whose destination is a terminal or the controller of the first sub-network, or another sub-network to be reached via the first sub-network, are stored in the buffer device 30.

The MAC frames of two sub-networks SN1 and SN2 are usually not synchronized. Therefore, a bridge terminal BT is not only connected to a sub-network SN1 or SN2 during a change-over time Ts, but also during a waiting time Tw. This can be learnt from FIG. 5, which shows a sequence of MAC frames of the sub-networks SN1 and SN2 and the MAC frame structure of the bridge terminal BT. The change-over time Ts is the time that is necessary for the bridge terminal to be able to synchronize with the sub-network. The waiting time Tw indicates the time between the end of the synchronization with the sub-network and the beginning of a new MAC frame of this sub-network.

Assuming that the bridge terminal BT is connected to a sub-network SN1 or SN2 only for the duration of a MAC frame, the bridge terminal BT has only a channel capacity of ¼ of the available channel capacity of a sub-network. In the other extreme case, where the bridge terminal BT is connected to a sub-network for a longer period of time, the channel capacity is half the available channel capacity of a sub-network.

As described above, each sub-network includes a central controller for controlling the assigned sub-network. When a sub-network is taken into operation, it is to be ensured that only one terminal takes over the function of central controller. It is assumed that not any terminal can take over the function of central controller. When a central controller is determined, the procedure is, for example, that each terminal that can take over a function of controller checks whether in its receive range there is another terminal that can carry out the function of controller. If this is the case, the detecting terminal establishes that it does not become the controller. If all the other terminals also make this check, in the end there will be one terminal that detects no other terminal that has the function of controller and it thus takes over the function of controller.

It may happen that a sub-network is to be reconfigured. This may be because of the following reasons:

central controller switched off, insufficient power conditions of the central controller, poor connections of one or various terminals, insufficient capacity conditions in one or various sub-networks, new terminals to be integrated or switched off in the sub-network and terminal leaving the sub-network.

For reconfiguring a sub-network, a distance matrix can be used which immediately indicates the distance between two terminals in free space via the received signal strength RSS2. An example of such a distance matrix is shown in FIG. 6. In the distance matrix the terminals are referred to as T1 to T6 and the received signal strengths as RSS2($x,y$). RSS2($x,y$) stands for the signal strength of the terminal Ty measured by the terminal Tx.

For determining a new central controller, various criterions can be applied. One criterion is the following: Each terminal calculates the sum of all the received signal strengths (RSS2($x,y$)) to its direct neighbors and divides this sum by the number of the direct neighbors. The terminal having the smallest calculated value then becomes the new controller. This method will be referred to as LDV (Lowest Distance Value) in the following.

The lowest distance value of each terminal in the neighborhood of the current central controller can be determined by this current central controller itself. The current central controller itself knows all the received signal strengths (RSS2) of the terminals in its sub-network. These signal strengths have been determined during operation by the individual terminals of its sub-network and announced to the current controller. Furthermore, the current controller also knows the distance matrices of its neighboring or also further remote sub-networks. These distance matrices have regularly been announced to the current controller by the controllers of the other sub-networks. Similarly, the current controller has transmitted its distance matrix to the controllers of the other sub-networks. As a result, the current controller does not only know the received signal strengths of its assigned terminals (the terminals in its own sub-network), but also those of other sub-networks. With the aid of its own distance matrix and the distance matrix of the other sub-networks, the current controller can then calculate which terminal has the lowest distance value (LDV). This may also be the current controller. If the new controller is not the current controller, another exchange of control information is to take place.

The current controller may also be provided to send the distance matrices in the broadcast mode to the terminals of its sub-network and these terminals individually make a decision which controller becomes the central controller.

It is alternatively possible for each terminal to periodically send in the broadcast mode its own average received signal strengths (RSS2), which are then received by the neighboring terminals. Each terminal then individually decides whether the terminal itself becomes the central controller. The following routine may then take place:

A terminal continuously collects the average received signal strengths (RSS2) transmitted by a neighboring terminal. The received signal strengths are stored in a terminal and the sum of the received signal strengths is divided by the number of the neighboring terminals. After a rather long time a stored received signal strength and thus the calculated value of a terminal should be erased if nothing has been received any longer from this terminal over a predefined period of time. This avoids that terminals are not taken into consideration that have long stopped being active. The terminal then becomes the central controller if its own calculated value is lower than the lowest value of the other terminals. The new central controller must then receive all the necessary control information from the current controller.

A further criterion for determining a central controller is referred to as ICT method (Highest In-Cluster Traffic). Herewith is calculated the sum of the useful data traffic that a terminal has with all its neighboring terminals. The device having the highest useful data traffic then becomes the central controller. It is then guaranteed that a large part of the useful data traffic is handled at any rate within the sub-network and thus that the transmission of data is reduced by at least one bridge terminal. With this method the same routines as defined with respect to the LDV method can be implemented for determining a central controller. Here too it is necessary to form a matrix that indicates the useful data traffic among the respective terminals and is called the traffic matrix. At an intersection of the matrix is then found a value that indicates the useful data traffic from one terminal to the other.

If the values defined above for selecting a new controller are periodically calculated by the current controller, there will often be a terminal whose value is better than the value of the current controller. If the decision criterion were strictly observed each time, the current controller would have to hand over the control function to the better suitable terminal. This would lead to frequent reconfigurations of the network (depending on the frequency of the calculation of the value). Since a reconfiguration is a burden on the network caused by necessary signaling, frequent reconfigurations should be avoided at all costs. Before the reconfiguration of one or more sub-networks, there should first be tested whether the change of the old configuration with the current controller is at all necessary. Only if this is the case would the reconfiguration according to the respective criterion have to take place.

Furthermore, a reconfiguration of one or more sub-networks could lead to the fact that they are no longer connected by a bridge terminal. Therefore, each terminal checks at regular distances whether it receives data or messages that cannot originate from the assigned sub-network. They may be messages or data transmitted at another carrier frequency. If a terminal has received such other message, it sends an inquiry to the controller whether there is a bridge terminal assigned to the present sub-network, which bridge terminal can process messages or data of this sub-network. If this is not the case, the terminal opens up a new sub-network which now connects the two other sub-networks that were not connected before. The terminal whose messages were received, is requested by the controller of the new sub-network to become a bridge terminal between its own sub-network and the newly arranged sub-network. If the case happens that a plurality of terminals have sent this request to the controller, the controller determines that one of these terminals becomes the new additional controller.

The invention claimed is:

1. A network comprising a plurality of terminals, of which
   at least one terminal is provided for storing certain traffic ratios between at least part of the terminals measured at predefined distances and
   at least one terminal is provided for ascertaining, based on the stored traffic ratios, whether a change of the function of network controller from one terminal to another is necessary.

2. A network as claimed in claim 1, characterized in that a terminal is provided for measuring the received signal strengths of another terminal.

3. A network as claimed in claim 2, characterized in that a terminal is provided for calculating a value which is formed by the sum of all the received signal strengths of a terminal to its neighboring terminals divided by the number of neighboring terminals and in that the terminal having the lowest value is provided for taking over the function of network controller.

4. A network as claimed in claim 1, characterized in that a terminal is provided for measuring the useful data traffic with another terminal.

5. A network as claimed in claim 4, characterized in that a terminal is provided for calculating a value which is formed by the sum of the useful data traffic of a terminal with the neighboring terminals, and in that the terminal having the highest value is provided for taking over the function of network controller.

6. A network as claimed in claim 1, characterized in that at least the terminal referred to as controller has the function of network controller for storing the traffic ratios between at least part of the terminals in the form of a matrix.

7. A network as claimed in claim 6, characterized in that the controller is provided for broadcasting the stored matrix to all the terminals and in that a terminal is provided for ascertaining on the basis of the matrix whether it is to take over the function of controller.

8. A network as claimed in claim 1, characterized in that a plurality of sub-networks have each a terminal referred to as controller and executing the respective function of network controller of the sub-network, in that the sub-networks are provided via bridge terminals to exchange messages and data between the sub-networks, in that at least one terminal in a sub-network is provided for storing its own traffic ratios and the traffic ratios of the other sub-networks and in that the traffic ratios of each sub-network stored in a terminal are provided for ascertaining whether a change of the function of network controller from one terminal to another is necessary.

9. A network as claimed in claim 1, characterized in that after a change of the function of network controller from one terminal to another terminal the current terminal that has the function of network controller is provided for transferring the control information to the actual terminal that has the function of network controller.

10. The network of claim 1, wherein said at least one terminal for ascertaining that said change is necessary includes any one of said plurality of terminals.

11. The network of claim 1, wherein said plurality of terminals are configured to ensure that only one of said plurality of terminals takes over the function of the network controller.

12. The network of claim 1, wherein said plurality of terminals is configured to avoid said change of the function of the network controller when said change is not necessary.

13. The network of claim 1, wherein one of said plurality of terminals is configured as a bridge terminal to exchange messages between a first sub-network and a second sub-network, said bridge terminal being connected to said first sub-network and said second sub-network during a change-over time and during a waiting time.

14. A terminal in a network comprising a plurality of further terminals, which terminal is provided for storing certain traffic ratios between at least part of the terminals measured at predefined distances and for ascertaining, based on the stored traffic ratios, whether a change of the function of network controller from one terminal to another terminal is necessary.

15. The terminal of claim 14, wherein said terminal is configured to avoid said change of the function of the network controller when said change is not necessary.

16. A network, comprising:

a plurality of terminals;

wherein a first set of at least one terminal includes means for storing certain traffic ratios between at least part of the terminals measured at predefined distances; and wherein a second set of at least one terminal includes means for ascertaining, based on the stored traffic ratios, whether a change of the function of network controller from one terminal to another is necessary.

17. The network of claim 16, wherein the first set of at least one terminal and the second set of at least one terminal are entirely identical.

18. The network of claim 16, wherein the first set of at least one terminal and the second set of at least one terminal are partially identical.

19. The network of claim 16, wherein the first set of at least one terminal and the second set of at least one terminal are entirely dissimilar.

20. The network of claim 16, wherein said plurality of terminals is configured to avoid said change of the function of the network controller when said change is not necessary.

* * * * *